United States Patent [19]

Loup et al.

[11] 4,406,307
[45] Sep. 27, 1983

[54] DIRECTIONAL VALVE WITH SPOOL TRANSFER LOOP

[75] Inventors: Ronald L. Loup, Clarkston; Curtis H. Day, Manchester; Rainer Teichert, Plymouth, all of Mich.

[73] Assignee: Double A Products Company, Manchester, Mich.

[21] Appl. No.: 249,348

[22] Filed: Mar. 31, 1981

[51] Int. Cl.³ .......................................... F15B 13/044
[52] U.S. Cl. .............................. 137/625.65; 251/137
[58] Field of Search ............... 137/625.65; 251/48, 251/137

[56] References Cited

U.S. PATENT DOCUMENTS

| | | | |
|---|---|---|---|
| 2,916,019 | 12/1959 | Murphy | 137/625.65 |
| 3,324,890 | 6/1967 | Whitmore et al. | 137/625.65 X |
| 3,701,366 | 10/1972 | Tirelli et al. | 137/625.65 |
| 3,896,856 | 7/1975 | Schumacher et al. | 137/625.65 |
| 4,056,126 | 11/1977 | Hauser et al. | 137/625.65 |
| 4,353,394 | 10/1982 | Loup | 251/137 X |

FOREIGN PATENT DOCUMENTS 2725917 9/1978 Fed. Rep. of Germany .................. 137/625.65

Primary Examiner—Gerald A. Michalsky
Attorney, Agent, or Firm—Stephenson & Boller

[57] ABSTRACT

A solenoid operated directional valve 10 that has cushioning chambers 48 and 50 into which the attenuation elements 52 and 54 on the ends of the spool 38 are received for cushioning the movement of the spool, and a transfer loop 56 through which fluid can travel during the cushioning operation, characterized in that the attenuation elements are constructed and arranged so that they will function to purge air or other gaseous fluids from the cushioning chambers and the transfer loop as an incident to reciprocal movement of the spool.

10 Claims, 2 Drawing Figures

DIRECTIONAL VALVE WITH SPOOL TRANSFER LOOP

TECHNICAL FIELD

The present invention relates to a directional valve which has a spool for movement to a desired position for controlling the direction of flow of hydraulic fluid through the valve, and which has hydraulic cushioning means associated with the spool for cushioning movement of the spool as it reciprocates in the valve body in response to action of solenoid assemblies or the like.

BACKGROUND ART

Solenoid operated directional valves that have hydraulic cushioning means associated with the spool thereof are known in the art. Thus, it is conventional practice to provide a solenoid operated directional valve having a valve body provided with passageways for directing flow of hydraulic fluid, a spool mounted for movement in the valve body and movable to selected positions for controlling flow of hydraulic fluid through the passageways, oppositely acting solenoids arranged to actuate the spool in one direction or the other, cushioning chambers in the valve body adjacent to each solenoid for containing hydraulic fluid and into which the ends of said spool can enter, the ends of said spool defining attenuation elements for displacing fluid in the chambers so as to cushion the movement of the spool, and said valve body having a transfer loop providing communication between said chambers for restricted displacement of the fluid from one chamber to the other in response to movement of the attenuation elements.

Directional valves of the foregoing character normally include bleed ports and passageways for removal of air from the cushioning chambers and the transfer loop at initial start-up or following repair or maintenance of the directional valve. Allowing air to remain in the cushioning chambers and transfer loop can be very detrimental to the directional valve and will produce hammering and will cause the valve to malfunction.

To further complicate matters, removal of air from the cushioning system must be done at the site of installation of the directional valve, often by personnel who fail to perform the operation properly. Still further, many directional valves have the outlet of the bleed passageways at the upper side of the valve, located under the electrical junction box mounted thereon, which situation increases the time and work required for preparation to carry out the air purging operation. The time factor for then carrying out the purging operation is also unfavorable with respect to the prior art units. Very commonly, as many as several hundred cycles of operation of the prior art directional valve is required before the cushioning system is satisfactorily filled with hydraulic fluid to enable the valve to function properly.

Thus, there is a significant need for improvements in the art to enable the air to be purged quickly and effectively and in a manner that is automatically carried out without the need to disassemble the directional valve or to have the purging operation performed by inexperienced or unskilled operators.

SUMMARY OF THE INVENTION

The present invention has overcome the inadequacies of the prior art and provide a directional valve with an hydraulic cushioning system which is constructed and arranged so that the directional valve will automatically purge itself of air or other gaseous fluids in the cushioning system merely by the operation of the directional valve in its installed position.

According to one form of the present invention, a solenoid operated directional valve is provided which has a valve body with cushioning chambers and a transfer loop interconnecting the chambers and a spool with attenuation elements at the ends thereof for travel into the cushioning chambers for displacing hydraulic fluid therein to provide desired cushioning action, the invention being characterized in that the attenuation elements have pump means responsive to movement of the spool for transferring hydraulic fluid from adjacent passageways into the cushioning chambers and their interconnecting transfer loop when attenuation elements enter the cushioning chambers and for transferring gaseous fluids from the cushioning chambers and their interconnecting transfer loop into the adjoining passageways when the attenuation elements move out of the cushioning chambers. In a preferred form of the invention, the pump means includes a fluid-transfer chamber having a port arranged to open to its associated cushioning chamber when the attenuation element has entered the cushioning chamber and to open to one of the passageways when its attenuation element has moved out of its associated cushioning chamber. In this form of the invention, the pump means includes an outboard land and an inboard land spaced axially apart on the spool to define the axially inner and outer walls of the fluid transfer chamber. The axially-spaced walls define the port which opens radially outwardly from between these walls.

Other objects of this invention will appear in the following description and appended claims, reference being had to the accompanying drawings forming a part of this specification wherein like reference characters designate corresponding parts in the several views.

DESCRIPTION OF THE PREFERRED EMBODIMENT

Figure 1:
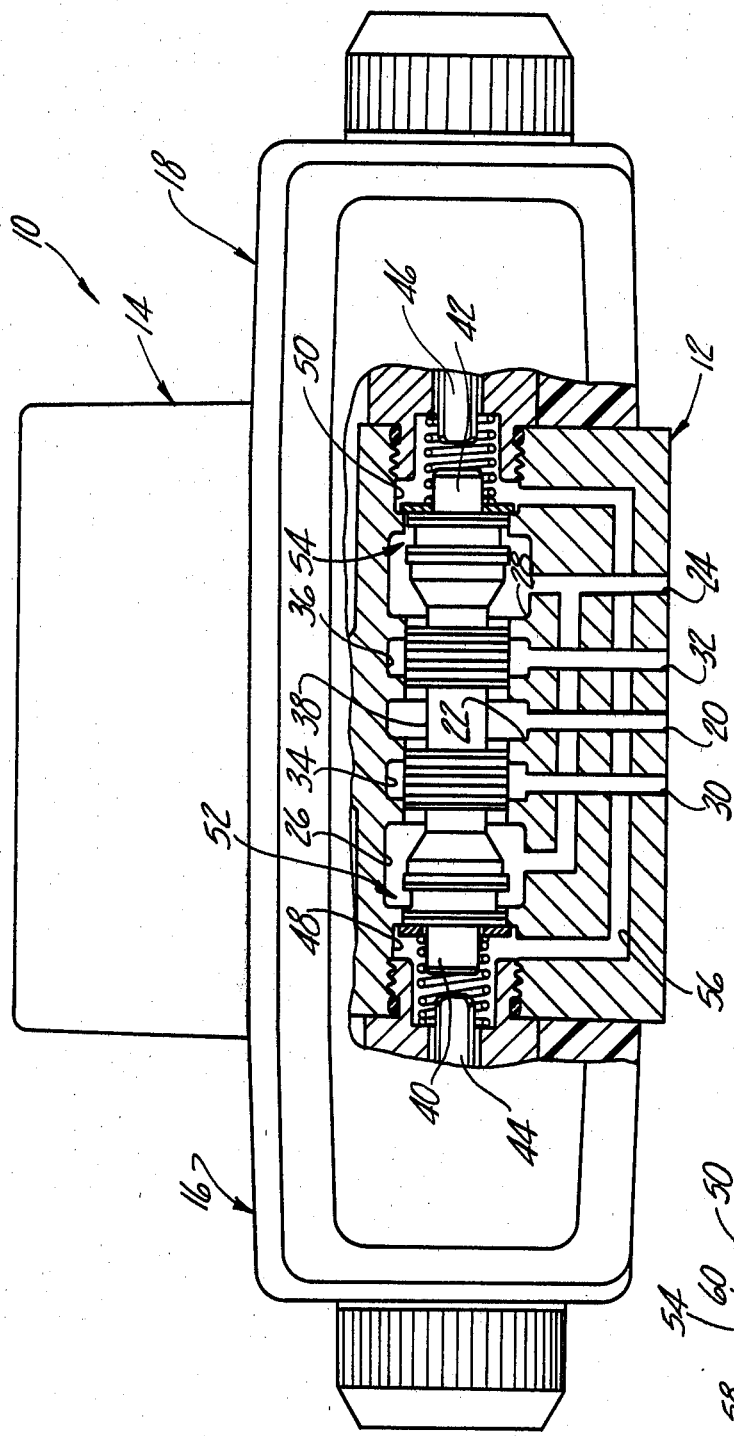
FIG. 1 is a front elevational view partly in section of a solenoid operated directional valve embodying the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawing, the invention will be described in greater detail. The solenoid operated directional valve 10 has a valve body 12 on which is mounted a junction box 14 and solenoids 16 and 18.

The valve body 12 has a conventional pressure port 20 through which hydraulic fluids can be supplied to the passageway 22; tank port 24 for discharge of hydraulic fluid from the passageways 26 and 28 to tank; and ports 30 and 32 for supplying working fluid under pressure or for returning the working fluid from hydraulically driven apparatus, such as hydraulic cylinders, and the like. For this purpose, the ports 30 and 32 are in communication with the passageways 34 and 36 of the valve body 12. The valve body 12 is in general a conventional construction and other arrangements can be provided for passageways for the hydraulic fluid. Mounted within the valve body 12 is a valve spool 38 which has opposite ends 40 and 42 which are adapted to be engaged at their terminal ends by the solenoid pins 44 and 46 of the solenoids 16 and 18, respectively. In the conventional manner, energizing the solenoid 18 will cause the solenoid pin 46 to move axially to the left allowing hydraulic fluid to enter the valve body 12 through the port 20 and to pass through passageways 22 and 34 to port 30. At the same time, return fluid can flow from a work station to port 32, and from there via passageways 36 and 28 to tank port 24.

In FIG. 1, the spool 38 is shown in a neutral position in which no hydraulic fluid is passing through the valve body 12. When it is desired to shift the spool to the opposite end of its stroke from that described above with regard to solenoid 18, the solenoid 16 will be energized and the solenoid pin 44 will then exert an axial thrust against the spool 38 to cause the spool and the two solenoid pins 44 and 46 to be shifted axially to the right. Thereafter, hydraulic fluid will be supplied from the pressure port 20 to the port 32, and at the same time, hydraulic fluid will be returned via the port 30 for passage to the tank via port 24.

The valve body 12 includes the cushioning chambers 48 and 50 adjacent to the solenoids 16 and 18 and arranged for containing hydraulic fluid. The ends 40 and 42 of the spool 38 are adapted to enter these cushioning chambers 48 and 50 during the reciprocation of the spool in response to action of the solenoids 16 and 18. The ends 40 and 42 of the spool define attenuation elements 52 and 54 for displacing fluid between the chambers 48 and 50 in a manner to cushion the movement of the spool 38. The valve body 12 has a transfer loop 56 providing communication between the chambers 48 and 50 and for allowing a restricted displacement of the fluid from one chamber to the other in response to movement of the attenuation elements 52 and 54 into the chambers.

Figure 2:
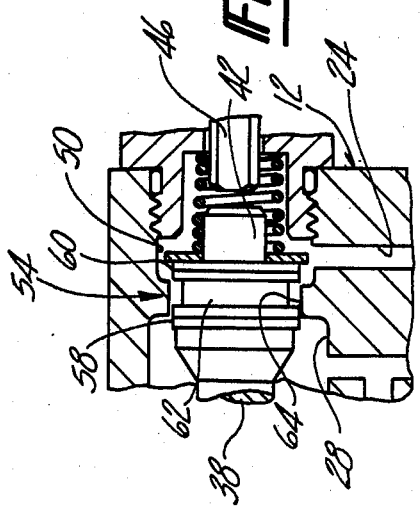
FIG. 2 is an enlarged fragmentary section showing the attenuation element on one end of the spool when the attenuation element is essentially at the end of the stroke of the spool after penetrating the cushioning chamber.

Referring now to FIG. 2, the novel features of the present invention will be described in greater detail. As there shown, the attenuation element 54 has axially spaced inboard land 58 and outboard land 60 which define between them a fluid-transfer chamber 62. The valve body 12 has the land 64 through which the axially spaced lands 58 and 60 move to maintain a substantially sealed relation between the cushioning chamber 50 and the adjacent passageway 28. The axial length of the body land 64 and of the axial dimension of the space between the lands 58 and 60 is such so that at one end of the stroke of the spool 38, the attenuation element 54 will have its fluid-transfer chamber 62 in communication with the associated cushioning chamber 50 as can be seen in FIG. 2. At the other end of the spool, the other attenuation element 52 will then have its fluid-transfer chamber in communication with the passageway 26. When the spool has been moved to the other end of its stroke, the attenuation element 52 will have its fluid-transfer chamber in communication with its associated cushioning chamber, and the attenuation element 54 will now have its fluid-transfer chamber in communication with the passageway 28. Thus, it can be seen that when the spool 38 reciprocates, the attenuation elements 52, 54 and their associated fluid-transfer chambers will reciprocate axially so that the fluid-transfer chambers will communicate alternately between their associated cushioning chambers and their adjacent passageways, and when so functioning will initially transfer hydraulic fluid from the adjacent passageways into the cushioning chambers, and on the return strokes any gaseous fluid in the cushioning chambers will be displaced into the fluid-transfer chamber and will be transported thereafter to the adjacent passageways for removal by virtue of the flow of hydraulic fluid through the passageway, and the gaseous fluid will then be discharged to tank.

Thus, the present invention provides apparatus which allows self-purging of gaseous fluids from the cushioning system of the directional valve. In operation, such purging is rapidly performed and may be completed in as few as six cycles of operation of the directional valve.

What is claimed is:

1. A solenoid operated directional valve having a valve body provided with passageways for directing flow of hydraulic fluid, a spool mounted for movement in the valve body and movable to selected positions for controlling flow of hydraulic fluid through the passageways, oppositely acting solenoids arranged to actuate the spool in one direction or the other, cushioning chambers in the valve body adjacent to each solenoid for containing hydraulic fluid and into which the ends of said spool can enter, the ends of said spool defining attenuation elements for displacing fluid in the chambers to cushion the movement of the spool, said valve body having a transfer loop providing communication between said chambers for restricting displacement of the fluid from one chamber to the other in response to movement of the attenuation elements, characterized in that said attenuation elements have pump means responsive to movement of said spool for transferring hydraulic fluid from said passageways into said cushioning chambers and their interconnecting transfer loop when the attenuation elements enter the cushioning chambers and for transferring gaseous fluids from said cushioning chambers and their interconnecting transfer loop into said passageways when the attenuation elements move out of the cushioning chambers, each said pump means comprising a pumping chamber constructed and arranged cooperatively with respect to the valve body such that over a limited extent of the spool travel the pumping chamber is blocked from simultaneous communication with both the corresponding cushioning chamber and the corresponding passageway.

2. A solenoid operated directional valve according to claim 1, characterized in that each pumping chamber has a port arranged to open to its associated cushioning chamber when its attenuation element has entered its associated cushioning chamber and to open to the corresponding passageway when its attenuation element has moved out of its associated cushioning chamber.

3. A solenoid operated directional valve having a valve body provided with passageways for directing flow of hydraulic fluid, a spool mounted for movement in the valve body and movable to selected positions for controlling flow of hydraulic fluid through the passageways, oppositely acting solenoids arranged to actuate the spool in one direction or the other, cushioning chambers in the valve body adjacent to each solenoid for containing hydraulic fluid and into which the ends of said spool can enter, the ends of said spool defining attenuation elements for displacing fluid in the chambers to cushion the movement of the spool, said valve body having a transfer loop providing communication between said chambers for restricting displacement of the fluid from one chamber to the other in response to movement of the attenuation elements, characterized in that said attenuation elements have pump means responsive to movement of said spool for transferring hydraulic fluid from said passageways into said cushioning chambers and their interconnecting transfer loop when the attenuation elements enter the cushioning chambers and for transferring the gaseous fluids from said cushioning chambers and their interconnecting transfer loop into said passageways when the attenuation elements move out of the cushioning chambers, in that each said pump means includes a fluid-transfer chamber having a port arranged to open to its associated cushioning chamber when its attenuation element has entered its associated cushioning chamber and to open to one of said passageways when its attenuation element has moved out of its associated cushioning chamber, and in that each pump means includes an outboard land and an inboard land spaced axially apart on said spool to define the axially inner and outer walls of the corresponding fluid-transfer chamber, the corresponding port opening radially outward from between said walls of the corresponding fluid-transfer chamber, said valve body having lands between said cushioning chambers and said passageways, and said inboard and outboard lands being adapted for travel through certain of said lands of the valve body.

4. A solenoid operated directional valve according to claim 3, characterized in that the axial spacing between said inboard and outboard lands of each pump means is less than the axial length of the associated land of the valve body through which each inboard and outboard land travels.

5. A solenoid operated directional valve having a valve body provided with passageways for directing flow of hydraulic fluid, a spool mounted for movement in the valve body and movable to selected positions for controlling flow of hydraulic fluid through the passageways, oppositely acting solenoids arranged to actuate the spool in one direction or the other, cushioning chambers in the valve body adjacent to each solenoid for containing hydraulic fluid and into which the ends of said spool can enter, the ends of said spool defining attenuation elements for displacing fluid in the chambers to cushion the movement of the spool, said valve body having a transfer loop providing communication between said chambers for restricted displacement of the fluid from one chamber to the other in response to movement of the attenuation elements, characterized in that said attenuation elements each have axially spaced lands defining between them a fluid-transfer chamber, and said valve body has lands through which said attenuation elements move to maintain a substantially sealed relation between said cushioning chambers and said passageways, said body lands and said attenuation elements having axial dimensions sufficient so that at one end of the stroke of said spool, one of said attenuation elements will have its fluid-transfer chamber in communication with its associated cushioning chamber and the other of said attenuation elements will have its fluid-transfer chamber in communication with one of said passageways, and at the other end of the stroke of said spool, the other of said attenuation elements will have its fluid-transfer chamber in communication with its associated cushioning chamber and said one attenuation element will have its fluid-transfer chamber in communication with one of said passageways, thereby pumping from said cushioning chambers to said passageways gaseous fluids that may be present in said cushioning chambers and replacing such fluids with hydraulic fluids from said passageways during reciprocation of said spool.

6. A solenoid operated directional valve according to claim 5, characterized in that each said fluid-transfer chamber defined by axially spaced lands comprises a groove in said spool extending circumferentially around the spool, the width of said groove measured in an axial direction being less than the axial width of the associated body land.

7. A solenoid operated directional valve according to claim 5, characterized in that abutment means are in said valve body which limit the extent of movement of each attenuation element into its cushioning chamber such that at the position of maximum movement of each attenuation element into the corresponding cushioning chamber the corresponding axially inboard land is located within the sealing confines of the associated body land and the corresponding fluid-transfer chamber is open to the corresponding cushioning chamber.

8. A solenoid operated directional valve according to claim 7, characterized in that when one attenuation element is at its maximum into the corresponding cushioning chamber the other attenuation element is then located so that the axially inboard land thereof is in the corresponding one passageway and the fluid-transfer chamber of said other attenuation element is open to said corresponding one passageway so that hydraulic fluid in said corresponding one passageway can flow to the fluid-transfer chamber of said other attenuation element.

9. A solenoid operated directional valve according to claim 5, characterized in that each of said passageways is located in said valve body for discharge to tank so that gaseous fluids pumped from said cushioning chambers will be removed by hydraulic fluids flowing from said valve body.

10. A solenoid operated directional valve having a valve body provided with passageways for directing flow of hydraulic fluid, a spool mounted for movement in the valve body and movable to selected positions for controlling flow of hyraulic fluid through the passageways, oppositely acting solenoids arranged to actuate the spool in one direction or the other, cushioning chambers in the valve body adjacent to each solenoid for containing hydraulic fluid and into which the ends of said spool can enter, the ends of said spool defining attenuation elements for displacing fluid in the chambers to cushion the movement of the spool, said valve body having a transfer loop providing communication between said chambers for restricting displacement of the fluid from one chamber to the other in response to movement of the attenuation elements, characterized in that said attenuation elements have pump means responsive to movement of said spool for transferring hydraulic fluid from said passageways into said cushioning chambers and their interconnecting transfer loop when the attenuation elements enter the cushioning chambers and for transferring gaseous fluids from said cushioning chambers and their interconnecting transfer loop into said passageways when the attenuation elements move out of the cushioning chambers, each said pump means comprising a pumping chamber constructed and arranged cooperatively with respect to the valve body such that during spool travel toward each cushioning chamber the corresponding pumping chamber: (1) has communication with the corresponding passageway but not with the corresponding cushioning chamber, (2) subsequently has no communication with either the corresponding passageway or the corresponding cushioning chamber, and (3) still subsequently has communication with the corresponding cushioning chamber but not with the corresponding passageway.

* * * * *